Jan. 27, 1931.  E. KATZINGER  1,789,981
METHOD OF MAKING MULTIPLE BAKING PANS
Filed Sept. 11, 1926  4 Sheets-Sheet 1
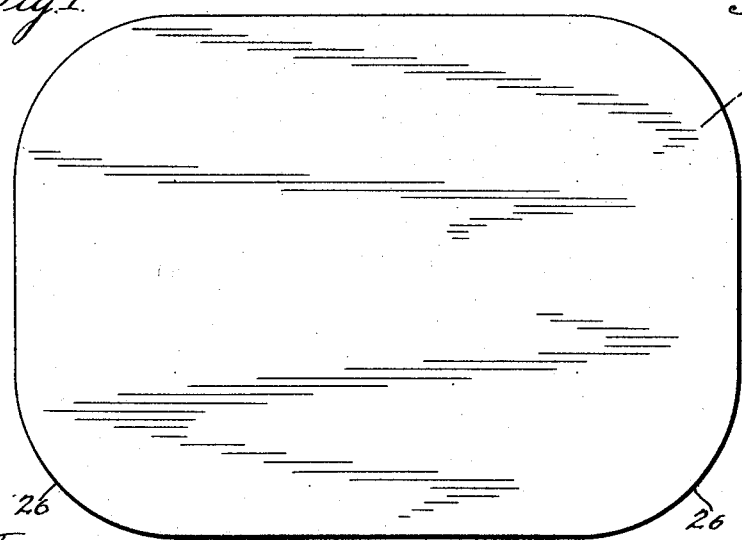
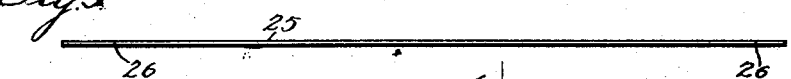
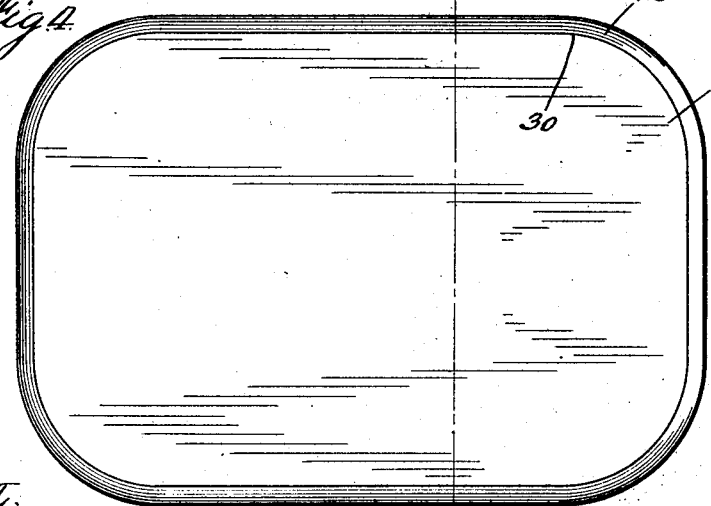
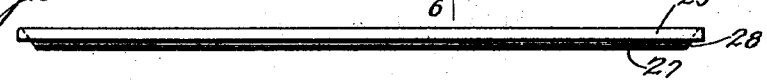
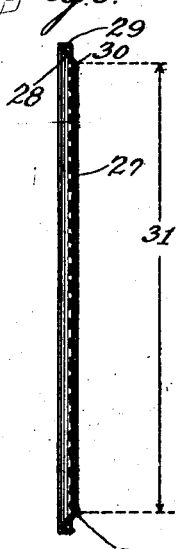
Inventor
Edward Katzinger
By Nissen & Crane
Attys Jan. 27, 1931.  E. KATZINGER  1,789,981
METHOD OF MAKING MULTIPLE BAKING PANS
Filed Sept. 11, 1926  4 Sheets-Sheet 2
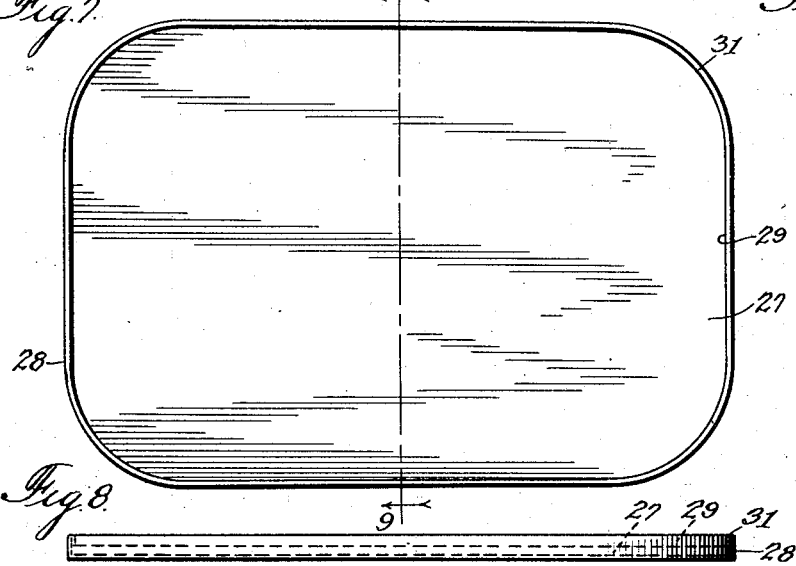
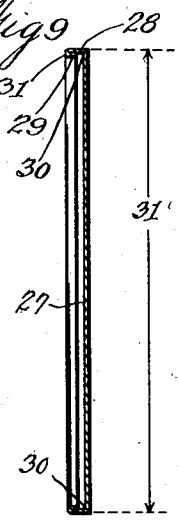
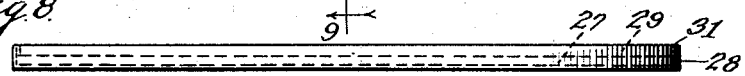
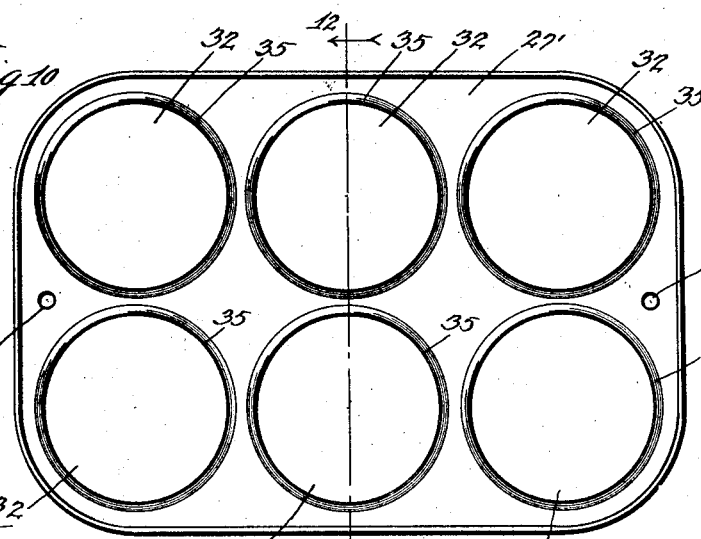
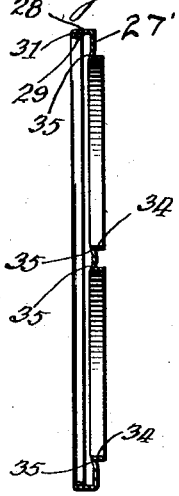
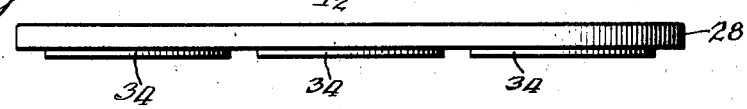
Inventor:
Edward Katzinger
By Nissen & Crane
Attys.

Jan. 27, 1931.  E. KATZINGER  1,789,981
METHOD OF MAKING MULTIPLE BAKING PANS
Filed Sept. 11, 1926  4 Sheets-Sheet 3
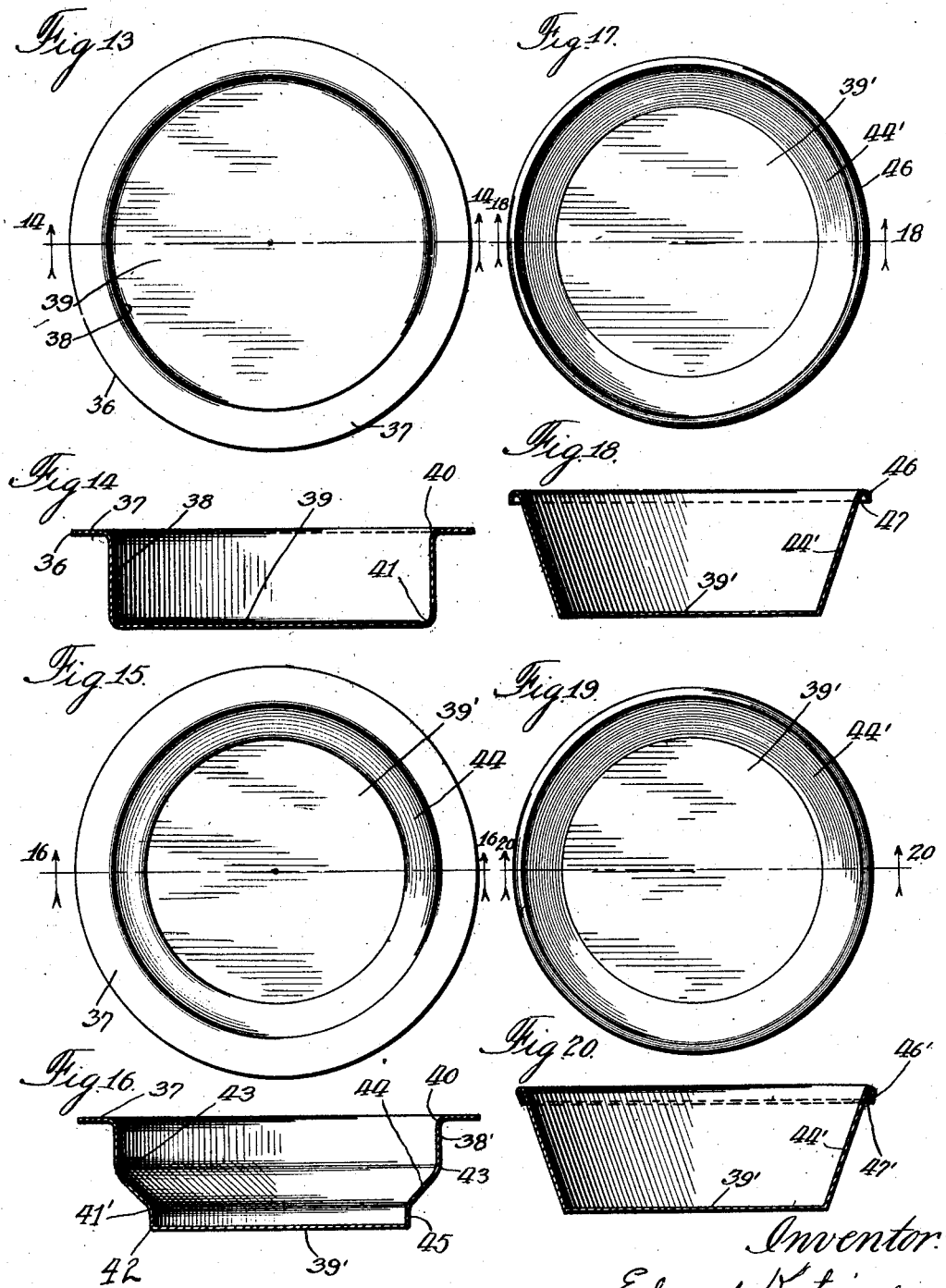

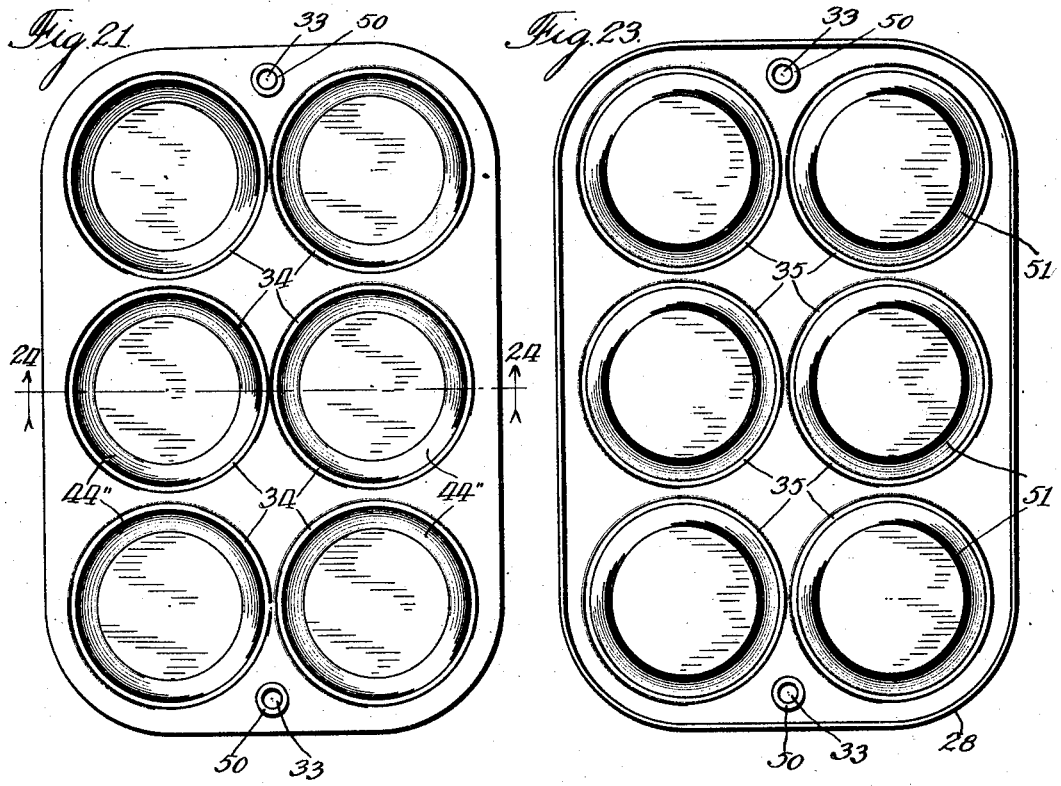
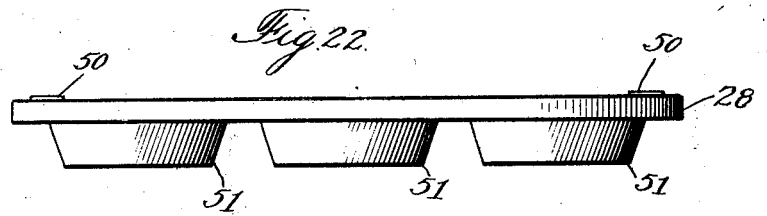
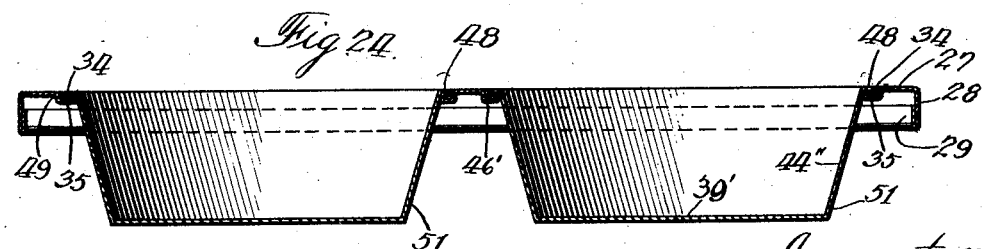
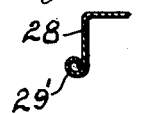

Patented Jan. 27, 1931

1,789,981

UNITED STATES PATENT OFFICE

EDWARD KATZINGER, OF CHICAGO, ILLINOIS, ASSIGNOR TO EDWARD KATZINGER COMPANY, OF CHICAGO, ILLINOIS, A CORPORATION OF ILLINOIS

METHOD OF MAKING MULTIPLE BAKING PANS

Application filed September 11, 1926. Serial No. 134,900.

My invention relates to multiple bake pan sets and one of the objects of the invention is to improve and simplify the construction thereof.

Another object of the invention is to improve and simplify the method of manufacturing multiple bake pan sets to secure maximum strength with a minimum amount of sheet metal used in the construction of such bake pan sets.

A further object of the invention is to improve the individual pans and the supporting frame to obtain liquid-tight joints between such pans and said frame and thereby make the multiple bake pan set very sanitary.

Another object of the invention is to provide a strong multiple bake pan set light in weight and free from cutting edges on the supporting frame.

Other objects of the invention will appear hereinafter, the novel features and combinations being set forth in the appended claims.

In the accompanying drawings—

Fig. 1 illustrates a sheet metal blank for the supporting frame;

Fig. 2 is an end elevation of such blank and Fig. 3 is a longitudinal elevation of the blank;

Fig. 4 is a plan view of the frame after the peripheral edge of the blank has been shaped according to the first step in the method of making the supporting frame;

Fig. 5 is an elevation or longitudinal edge view of Fig. 4;

Fig. 6 is a cross-sectional view taken on the line 6—6 of Fig. 4 looking in the direction of the arrows;

Fig. 7 is a plan view of the frame after the second step has been taken in shaping it in the method of making the supporting frame;

Fig. 8 is an elevation or longitudinal edge view of Fig. 7;

Fig. 9 is a cross-sectional view of Fig. 7 on the line 9—9 looking in the direction of the arrows;

Fig. 10 is a bottom plan view of the frame after holes for the bake pans have been cut and the edges thereof upset;

Fig. 11 is a longitudinal elevation or edge view of Fig. 10;

Fig. 12 is a cross-sectional view of Fig. 10 on the line 12—12 looking in the direction of the arrows;

Fig. 13 is a plan view of the first stage in the manufacture of the individual bake pans which are to be inserted into the holes in the supporting frame;

Fig. 14 is a sectional elevation of such individual pan taken on the line 14—14 of Fig. 13 looking in the direction of the arrows;

Fig. 15 is a plan view of the pan after shaping the pan during the second stage of manufacturing the pan;

Fig. 16 is a sectional elevation taken on the line 16—16 of Fig. 15 looking in the direction of the arrows;

Fig. 17 is a plan view of the pan after the third stage of manufacture of the pan;

Fig. 18 is a sectional elevation of Fig. 17 on the line 18—18 looking in the direction of the arrows;

Fig. 19 is a plan of the pan as it is shaped by the fourth step in the manufacture of the pan;

Fig. 20 is a sectional elevation of Fig. 19 on the line 20—20 looking in the direction of the arrows;

Fig. 21 is a plan view of the completed multiple bake pan set;

Fig. 22 is an elevation of the completed multiple bake pan set;

Fig. 23 is a bottom plan view of the structure shown in Fig. 21;

Fig. 24 is a sectional view of Fig. 21 on the line 24—24 looking in the direction of the arrows; and Fig. 25 is a fragmentary sectional view showing a modified detail of construction.

While my improved multiple bake pan set is particularly adapted for use as a muffin, corn or cake pan, it may have a general application and while it may be of a convenient size for such particular use, it may be made of any desired size. However, it is desired to reduce the weight of the pan to a minimum so as to reduce the cost of construction and to facilitate handling during use, and one of the principal features of my invention is the construction which greatly strengthens the multiple bake pan set as a whole so that it will not easily bend or become distorted, even though made light by reducing the weight of the sheet metal embodied in the multiple bake pan.

In constructing my improved bake pan set a blank 25 is first cut from a sheet of metal such as what is usually called tin, with the corners rounded as indicated at 26 in Fig. 1. Such blank of sheet metal with rounded corners is next stamped between suitable dies to shape the peripheral edge, as indicated in Figs. 4, 5 and 6. The bottom depressed portion 27 remains flat and is surrounded by the inclined or beveled peripheral wall 28 while a flange 29 is formed at right angles to the plane of the flat portion 27.

In the next step in the manufacture of the pan frame the blank peripherally shaped as shown in Figs. 4, 5 and 6 is placed between another set of dies which are operated in a suitable machine to force the flange 29 flat against the adjacent wall 28 and to turn over the beveled wall 28 along the edge of periphery 30 of the bottom 27 to form the reinforced flange 31, as shown in Figs. 7, 8 and 9. The rounded corners 26 facilitate such flanging having the rounded surfaces at 31. It should be particularly noted that what appears in plan in Fig. 4 as the flat bottom 27 will be on the under side of Figs. 7 and 8 and at the right in Fig. 9, because by means of the dies the beveled wall 28 has been turned at and along the line 30 from a position at one side of the plane of the bottom 27 to a position on the opposite side of such plane. It will also be seen that the dimensions of the blank have been reduced in this operation, the width of the bottom 27 as indicated by the arrows 31' in Fig. 6 being equal to the width of the flanged frame of Figs. 7, 8 and 9, as indicated by the arrows 31' in Fig. 9. The length of the flanged frame shown in Fig. 7 is correspondingly reduced as compared to the length of the blank shown in Fig. 4.

In the next stage of the manufacture of the frame, a plurality of pan openings 32 and small end suspension openings or holes 33 are cut through the frame shown in Figs. 7, 8 and 9. By means of suitable dies the peripheral edges of the openings 32 are upset, as shown at 34 in Figs. 11 and 12, while at the same time the metal surrounding the flanges 34 is beveled at 35 relative to the plane of the bottom 27'. With respect to the completed bake pan set the left-hand side of Fig. 12 is the lower side of the pan frame and the right-hand side thereof is the upper side and therefore Fig. 10 is a bottom plan view of the frame structure, as will more fully appear hereinafter. The flanges 34 are therefore upstanding at right angles to the plane of the bottom 27' and the circular bevels 35 are depressed relative to the plane of the bottom 27'.

Now, in the manufacture of the individual pans which are to be secured to the pan frame in the prepared openings therein, a pan of sheet metal, such as tin, is first stamped and shaped by means of suitable dies and the peripheral edges cut to have a true circular shape, as shown in Fig. 13, at 36. A flat ring-shaped flange is formed in a horizontal plane at the upper edge of an upright cylindrical wall 38 while the bottom 39 is flat and in a plane parallel to the plane of the ring 37. The metal at the juncture between the ring flange 37 and the cylindrical wall 38 is rounded, as indicated at 40, and at the juncture between the bottom 39 and the wall 38 the metal is likewise rounded, as shown at 41.

In order that the finished pan may have the shape of a frustum of a cone, as shown in Fig. 24, it is highly desirable to shape the same gradually from the pan shown in Fig. 14. Unless the shaping of the pan is produced gradually the conical walls are likely to be irregular or crimped instead of being smooth and continuous. I, therefore, prefer to operate on the pan of Figs. 13 and 14 with suitable dies as an intermediate step to form the pan shown in Figs. 15 and 16. It should be particularly noted that when the pan shown in Fig. 16 has been formed from that shown in Fig. 14 the bottom 39' has been reduced in diameter and the depth of the pan increased, while the diameter of the upper opening and the size and shape of the ring flange 37 remain the same as before. This can readily be seen by comparing the rounded circular bottom corner 41 of Fig. 14 with the circular rounded portion 41' of Fig. 16 above the bottom circular corner 42. Beginning about half way down the cylindrical wall 38 of Fig. 14 the metal is curved inwardly at 43 from the wall 38' on an incline 44 to the vertical cylindrical wall 45, thus giving the pan a shape somewhat similar to a bowl.

In the next step in the manufacture of the individual pans suitable dies are used to operate on the pan in Fig. 16 to secure the pan as shaped in Fig. 18. This step in the manufacture consists in changing the shape of the wall above the bottom 39' to a true frustum of a cone so that the wall surface on the inside of the pan will be smooth and continuous and free from irregularities in the surface of the metal due to crimping or otherwise. It should be noted that in shaping the pan of Figs. 17 and 18 from that shown in Figs. 15 and 16, the depth has been increased because a portion of the flange 37 adjacent the circular rounded edge 40 has been added to the conical wall so as to be conically continuous therewith. The bottom 39' of Fig. 18 is the same in diameter as the bottom 39' of Fig. 16. The periphery of the flange 37 has been upset as shown in Figs. 17 and 18 at 46, leaving an inverted annular trough or groove 47 on its underside.

As shown in Figs. 19 and 20, the upset flange 46 of Fig. 18 is bent toward the pan wall 44' so as to be inclined approximately in the same direction as such wall 44', as indicated at 46' in Fig. 20, care being taken to leave sufficient space to form a deep narrow groove 47' around the upper circular edge of the pan under the flange 46', so as to be capable of freely receiving the thickness of the metal used for the circular cylindrical flanges 34 of Fig. 12, as will more fully appear later on.

The pan frame having been formed, as shown in Figs. 10, 11 and 12, and a plurality of pans having been formed each as shown in Figs. 19 and 20, the final step of assembly may now be carried out. The frame shown in Figs. 10, 11 and 12 is arranged in connection with suitable dies with the flanges 34 extending upwardly and a pan shaped as shown in Fig. 20 is placed in each of the circular openings surrounded by the flanges 34. It should be understood that the upper portion of the pans are appreciably larger in diameter than the openings in the pan frame because of the necessary amount of metal required to form the interlocking connections shown at 48 in the enlarged view in Fig. 24. The pans when placed in the openings in the pan frame each has a wall portion projecting above the flanges 34 but when the dies are operated to force the pans down through the openings the peripheral flanges 34 bend outwardly along the outer surfaces of the walls 44', thereby alining themselves with the circular grooves or recesses 47' in the flanges 46'. This may be done without distorting the pan walls because of the dies in the pans conforming to the shape of the pans themselves.

After the flanges 34 have been bent outwardly and have fully entered the grooves 47' the flanges 46' together with the flanges 34 therein are forced by the dies to a horizontal position. Furthermore, the beveled portions 35 of Fig. 12 are depressed and the metal of the frame surrounding such beveled portions 35 is bent or upset, as indicated at 49 in Fig. 24, to secure a liquid-tight joint between each pan and the frame. At the same time the upper surface of each joint is approximately in a horizontal plane coinciding with the plane of the upper surface of the portion designated 27' in Fig. 12. The shapes of the mating dies can readily be seen by referring to Fig. 24. The formation of a liquid-tight joint 48 between each pan and the pan frame is an important feature of my invention as it results not only in producing a very strong and rigid connection between each pan and the pan frame, thus materially strengthening the whole structure, but also renders the pan very sanitary since no liquid baking material can collect between the pans and the frame at such joints. It can readily be seen by referring to the enlarged view in Fig. 24 that the horizontal positions of the interlocking connections lend themselves efficiently to being squeezed very tightly between suitably shaped dies to produce such liquid-tight, sanitary joints. On account of the upper peripheral portion of the pan of Fig. 20 being turned over to a horizontal position the depth of the pan in Fig. 24 becomes somewhat less relative to the depth when of the shape and size shown in Fig. 20. I have therefore designated the pan wall 44'' in Fig. 24.

All of the pans of Fig. 20 may be connected to the pan frame of Fig. 12 by means of a suitable multiple die or sets of dies all operated at the same time to secure the interlocking liquid-tight, sanitary connections shown in Fig. 24 and at the same time the peripheries of the end suspension holes 33 in the frame may be grooved to form reinforcing rings 50. By means of the reinforced end openings 33 the bake pan set may be suspended on a support, such as a nail, wherever desired.

The complete bake pan set is shown in top plan view in Fig. 21, in bottom plan view in Fig. 23, in elevation in Fig. 22, and in enlarged sectional elevation in Fig. 24. By referring to Figs. 22 and 24 it will be clear that the upper surfaces of the joints between the pans and the frame are flush with the upper surface of the pan frame itself and that the upper edges of the individual pans are in the plane of such upper surface.

It should also be particularly noted that the periphery of the pan frame is entirely free from any exposed edges of cut metal and therefore those using the bake pan set cannot cut their hands or fingers. This is by reason of the upset flange 29 which has been turned back against the flange 28 to form the rounded surface 31. The formation of such structure free from exposed metal cutting edges is facilitated by the rounded corners 26 shown in Fig. 1. The pan frame is not only strengthened by such flange 29 but is rendered safer to handle. Such safety feature may also be obtained by simply beading the peripheral edge of the pan frame, thereby saving the material now shown in the flange 28, 29 and lightening the structure by reason of the use of less metal; but by reason of the strength and rigidity imparted to the whole bake pan set by the use of the vertical peripheral flange 28, 29, I prefer to use the latter in the bake pan set, as shown in the drawings. Instead of the backwardly bent flange 29 the lower edge of the flange 28 may be beaded, as shown at 29' in Fig. 25.

Obviously those skilled in the art may make various changes in the details and arrangement of parts without departing from the spirit and scope of my invention as defined by the claims hereto appended, and I wish therefore not to be restricted to the precise construction herein disclosed.

Having thus fully disclosed an embodiment of my invention, what I desire to secure by Letters Patent of the United States is:

1. The method of flanging the periphery of a sheet metal frame of a bake pan set which consists in providing the periphery of a sheet metal blank with a bevel around a flat bottom portion with a narrow flange at the periphery of the said bevel at right angles to the plane of said bottom, and then bending the said flange against said bevel and bending the bevel from one side of said bottom to a position at the other side of the plane of said bottom and at right angles to such plane.

2. The method of flanging the periphery of a flat blank which consists in beveling the periphery of a predetermined area of the blank and providing a narrow flange at the periphery of said bevel at right angles to the plane of said predetermined area, and then bending the bevel and said flange to form a flange at right angles to the periphery of said predetermined area with the edge of said last-named flange rounded by the aforesaid narrow flange.

In testimony whereof I have signed my name to this specification on this 8th day of September, A. D. 1926.

EDWARD KATZINGER.